Figure 2:
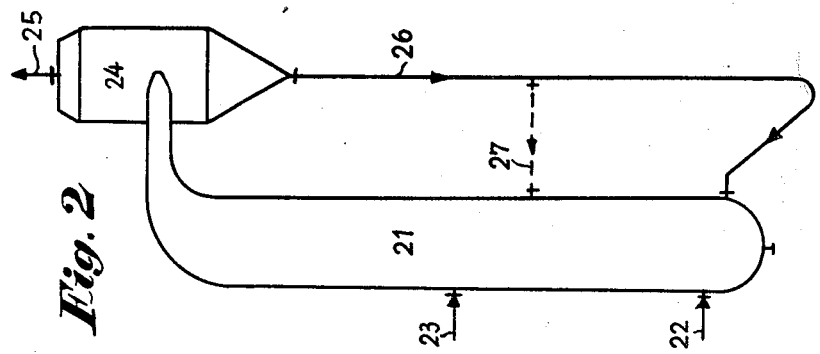

March 9, 1965 L. HÖRNIG ETAL 3,172,913
PROCESS FOR OXIDIZING OLEFINS
Filed Dec. 15, 1959 2 Sheets-Sheet 1

United States Patent Office 3,172,913
Patented Mar. 9, 1965

3,172,913
PROCESS FOR OXIDIZING OLEFINS
Lothar Hörnig, Emmerich Paszthory and Otto Probst, Frankfurt am Main, and Alfons Steinmetz, Kelkheim, Taunus, all of Germany, assignors to Farbwerke Hoechst Aktiengesellschaft vormals Meister Lucius & Brüning, Frankfurt am Main, Germany, a corporation of Germany
Filed Dec. 15, 1959, Ser. No. 859,636
Claims priority, application Germany, Dec. 19, 1958, F 27,318
4 Claims. (Cl. 260—597)

The present invention relates to a process for oxidizing olefins to aldehydes, ketones and/or acids.

In several patent applications, for example U.S. patent applications Ser. Nos. 747,115, and now abandoned, and 747,116, both filed July 8, 1958, and Ser. No. 843,783, filed October 1, 1959, and now abandoned, Ser. No. 848,531, filed October 26, 1959, and now abandoned; Ser. No. 853,454, filed November 17, 1959, and now Patent No. 3,087,968; Ser. No. 853,453, filed November 17, 1959, and now abandoned; and Ser. No. 855,975, filed November 30, 1959, and now Patent No. 3,119,874, processes are described for oxidizing ethylene or other olefins, such as propylene, butylene, isobutylene and pentene, with oxygen or gases containing oxygen, if desired in admixture with inert gases, in a neutral to acid medium in the presence of water by means of liquid catalysts containing redox systems and preferably compounds of noble metals, to the corresponding aldehydes, ketones and/or acids corresponding to the aldehydes. The redox systems may also have a spontaneous catalytic action as is described, for example, in U.S. patent applications Ser. No. 765,272, filed October 6, 1958, and now Patent No. 3,104,263, and Ser. No. 791,816, filed February 9, 1959, and now abandoned. As noble metals there are advantageously used the noble metals of Group VIII of the Periodic Table which have a maximum stable valency of 4, such as ruthenium, rhodium, iridium, platinum and preferably palladium. As compounds which are capable of forming redox systems and are present in the catalyst there are used compounds of copper, mercury, cerium, thallium, tin, lead, titanium, vanadium, antimony, chromium, molybdenum, uranium, manganese, iron, cobalt or nickel.

Special forms of executing the process in separate reaction and regeneration zones have also been described in U.S. patent applications Ser. No. 750,150, filed July 22, 1958, and now Patent No. 3,122,586; Ser. No. 769,554, filed October 27, 1958, and now abandoned, and the aforesaid patent applications Ser. No. 843,783 and Ser. No. 848,531, filed October 1 and 26, 1959, respectively. The said patent applications also disclose processes which are carried out in a combined one stage-two stage system and according to which a small portion of oxygen is introduced into the reaction zone along with the oefins and the complete regeneration of the catalyst medium is carried out in a subsequent second stage. In these two-stage processes, it is in many cases advantageous to use air as oxidizing agent since the remaining nitrogen is not admixed with the olefin.

Now we have found that the amounts of catalyst liquid cycled per unit of time through the two stages of the process, i.e. the reaction and the regeneration stages, are advantageously varied independently of each other, that is the portion of catalyst liquid flowing per unit of time through the reaction zone is smaller than the portion flowing per unit of time through the regeneration zone or vice versa. This can be achieved in an advantageous manner by returning determined quantities of catalyst liquid, after they have passed through the reaction or the regeneration zone, respectively, without an immediate further regeneration or reaction, into the reaction or regeneration zone by means of a smaller catalyst cycle derived from the main catalyst cycle, and mixing them with the main catalyst cycle before or in the zone concerned.

If desired, the derived catalyst cycles may be admixed with the main catalyst cycles in the pipes through which the main cycles are introduced into the reaction or regeneration zone. The derived cycles may also be branched off, for example, from so-called quiescent vessels in which, according to a special form of the present process (see U.S. patent application Ser. No. 769,912, filed October 27, 1958, and now Patent No. 3,119,875) the gaseous catalyst components are separated from the liquid catalyst. Alternatively, derived catalyst cycles may be used only as secondary regeneration cycles or secondary reaction cycles. The derived cycle may be introduced at any desired position of the reaction or regeneration stage or of the pipe through which the main cycle is introduced into the reaction or regeneration zone.

The derived cycles of regenerated or reacted catalyst may still contain portions of reaction gases, advantageously in a small amount, especially when the derived cycles are branched off from the quiescent vessels. In this manner, the contact time of the reaction gases or reaction products in the catalyst medium can be increased. Especially, more slowly reacting gases can be reacted in relatively small apparatus. The term "gases" is here understood to mean also vapors.

The conditions of temperature, pressure and concentration in the derived cycles may differ from those prevailing in the corresponding main catalyst cycles. The portion of catalyst flowing per unit of time in the derived cycle may also be varied periodically or continuously, if desired. Furthermore, several derived cycles which may be of different volume may be branched off, if desired, from a main catalyst cycle and introduced as such or partially or wholly united into the corresponding zone or main cycle pipe. Alternatively, a derived cycle may be subdivided into several smaller cycles which may be of different volume and introduced in this form into the corresponding zone or the main cycle. As already implied by the term "derived cycle," the latter is always smaller than the remainder of the main cycle and generally consists of 5 to 25% by volume of the main cycle from which it has been derived.

The process of the present invention has the advantage that, with a given reaction or regeneration volume, the contact time applied for the reaction or regeneration process can be varied, independent of the prevailing conditions of temperature, pressure and gassing. In this manner, it is possible, for example, to vary the concentration of reacted catalyst components, for example cuprous chloride and metallic palladium, in the reaction zone and also in the regeneration zone or to keep the said concentration constant by varying the corresponding secondary cycle. For example, a small portion of reacted catalyst is advantageously added to the regenerated catalyst in the reaction zone prior to or during the olefin treatment. By proceeding in this manner, the amount of desired reaction product obtained per unit of reaction volume and per unit of time can be considerably increased.

The following methods of operation are described hereafter, without, however, limiting the application thereto; they are illustrated by way of example in the accompanying diagrammatic drawings.

Figure 1:
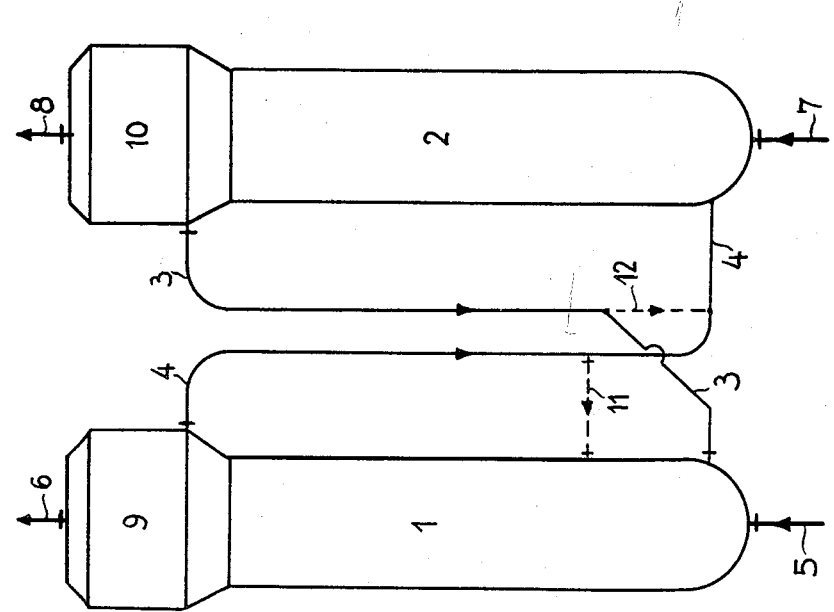

FIGURE 1 shows a two-stage unit comprising two separate vessels. Vessel 1 serves as reactor and encloses the reaction space; vessel 2 serves as regenerator and encloses the regeneration space. The regenerated liquid catalyst flows from regenerator 2 through pipe 3 into reactor 1 and the reacted catalyst flows from reactor 1 through pipe 4 into regenerator 2. Reactor 1 is charged through feed pipe 5 with olefin which, if desired, may be in admixture with an inert gas. In combined one stage-two stage processes, a small portion of oxygen or gases containing oxygen, if desired in admixture with the olefins or gases containing olefins, may be added. When the process is carried out in this manner, the ratio of olefin:oxygen in the first stage is suitably at least 2.5:1 and advantageously at least 6:1.

In quiescent zone 9 provided at the head of reactor 1, the catalyst liquid is separated from the gaseous components, such as reaction products, unreacted starting gases and by-products. The gases leave the reactor through pipe 6. Regenerator 2 is charged through feed pipe 7 with oxygen which, if desired, may be admixed with an inert gas and may advantageously be in the form of air. The gases containing oxygen may be introduced in one position as shown in FIG. 1 or in several positions distributed over the whole regenerator. In quiescent zone 10 provided at the head of regenerator 2 the gaseous components of the liquid catalyst are separated from the catalyst medium and then withdrawn from the quiescent zone 10 through pipe 8.

Part of the main catalyst flowing through pipe 4 is returned in a derived cycle through pipe 11 to reactor 1. Pipe 11 may lead, if desired, from any position of pipe 4 or directly from quiescent zone 9 to any suitable position of reactor 1. On the other hand, the derived cycle may flow through pipe 11 into main catalyst pipe 3 and proceed from there, after being mixed with the main catalyst cycle, in admixture with the main catalyst cycle to reactor 1. Part of the main catalyst cycle flowing through pipe 3 may be returned as a derived cycle through pipe 12 to regenerator 2. If desired, pipe 12 may lead from any position of pipe 3 or directly from quiescent zone 10 to any appropriate position of regenerator 2. For example, the derived cycle may flow, as shown in FIG. 1, through pipe 12 into main catalyst pipe 4 and proceed from there, after admixture with the main catalyst cycle, to regenerator 2. The catalyst is cycled through the whole system, for example, by mammoth pumps or pumps. If desired, the amount of catalyst flowing in a derived cycle through pipe 11 or 12 may be varied periodically or continuously during the process or only one of derived cycles 11 and 12 may be used.

FIG. 2 represents a two-stage unit in which the reaction zone and the regeneration zone are not arranged in two separate vessels. Gassing tower 21 is charged with olefin through feed pipe 22 and the catalyst liquid is simultaneously conveyed to the head of gassing tower 21 by mammoth pumps. The reacted catalyst is advantageously regenerated in the middle or upper section of gassing tower 21 with oxygen or gases containing oxygen, preferably air, introduced through pipe 23. The gaseous catalyst components are separated from the liquid catalyst in quiescent tower 24. The gases, such as oxygen, reaction products, any unreacted olefins and inert gases, leave quiescent tower 24 through pipe 25. The regenerated catalyst liquid is recycled through down pipe 26 to the lower part of gassing tower 21. Through pipe 27, part of the regenerated main catalyst cycle flowing through pipe 26, is returned in a derived cycle to the gassing tower.

The process of the present invention, especially when carried out in a flow tube and with an appropriate arrangement of apparatus, enables the quantity of desired reaction product obtained per unit of reaction volume and per unit of time and its concentration in the catalyst cycle leaving the reaction zone to be increased. The course of the total process is not disturbed, for example, by precipitation of the reduced stages of the redox compounds or noble metal compounds contained in the catalyst, such as cuprous chloride and palladium metal, which reduced stages are formed during the reaction. A cycle derived from the main catalyst cycle after the regeneration zone may be mixed with the cycled catalyst leaving the reaction zone, after the desired reaction products have been substantailly removed, for example by stripping, from the cycled catalyst leaving the reaction zone. The two cycles are advantageously mixed in the sump of the stripping column which, if desired, may be designed as rectifying column and in the middle or upper section of which the cycled catalyst coming from the reaction zone is freed from desired reaction products and any unreacted olefins. The mixture of the two catalyst cycles is returned to the regeneration zone.

When the regeneration is carried out under more severe conditions of temperature and pressure than, for example, the separation of the catalyst liquid from the gaseous components contained therein, the water vapor set free by the expansion of the regenerated derived catalyst cycle may be used for stripping. By the process of the invention a considerably larger quantity of desired reaction product per unit of time and per unit of reaction volume can be obtained while the concentration of the desired reaction product in the unit of catalyst volume conducted to the separation is simultaneously increased so that lower costs of apparatus and energy are needed for an apparatus of a determined capacity than with the known processes.

Figure 3:
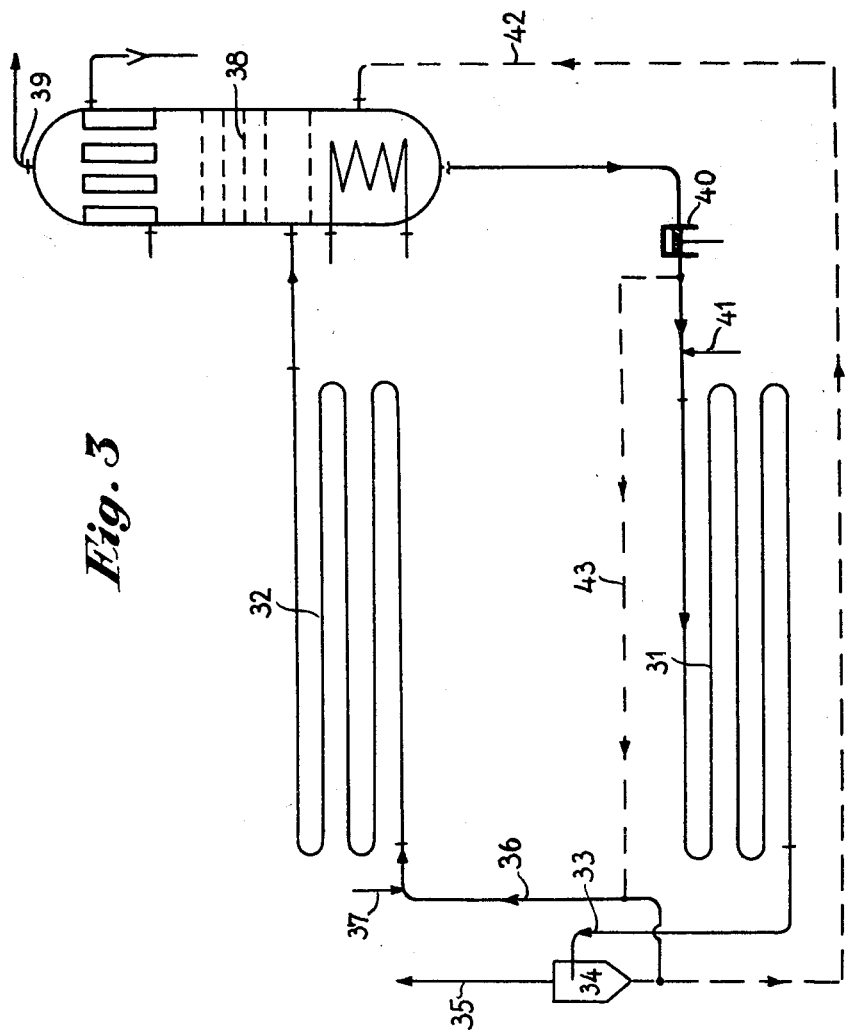

FIG. 3 illustrates the present invention as applied to the flow-tube process. The figure represents an apparatus which comprises a reaction space and a regeneration space arranged separately in two flow tube systems. Flow tube system 31 serves as regenerator and system 32 as reactor. The aqueous catalysts medium containing, per liter, 0.04 mol palladium, 1.74 mols copper, 3.65 mols chlorine ions and 30 grams acetic acid flows under a pressure of 22 atmospheres gage and at a temperature of 195° C., both measured at the regenerator outlet, from regenerator 31 through pipe 33, degassing device 34 and pipe 36 into flow tube reactor 32. The regenerator and the reactor consist of titanium pipes. After having passed through reactor 32 under a pressure of 20 atmospheres gage and at a temperature of 190° C., both measured at the reactor inlet, the catalyst is expanded and stripped in column 38 under a pressure of 1.8 atmospheres gage and at a temperature of 130° C. and then returned to regenerator 31 by pump 40. Through pipe 41, 2 m.$^3$ (measured at N.T.P.) of oxygen are introduced per hour under a pressure of about 25 atmospheres gage into the catalyst cycle. The unreacted oxygen is removed from the catalyst through degassing device 34 and pipe 35 and recycled to the catalyst through pipe 41 after regeneration and compression. 2 m.$^3$ (measured at N.T.P.) of a gas mixture consisting of 99% by volume ethylene and 1% by volume ethane are added under a pressure of 20 atmospheres gage through pipe 37 to the regenerated main catalyst cycle. After expansion to 1.8 atmospheres gage, the gaseous catalyst components of the reacted catalyst, for example acetaldehyde, unreacted ethylene, inert gases and small portions of by-products formed during the reaction, are stripped and rectified in column 38 and removed from the head of column 38 through pipe 39.

The unreacted ethylene is regenerated, compressed and introduced through pipe 37 into the regenerated main catalyst cycle. The ethylene may then still contain a small portion of acetaldehyde; the presence of the latter in the cycle gas does not, however, increase the amount of by-products.

If desired, the unreacted ethylene containing a small portion of acetaldehyde may be recovered from the reacted main catalyst cycle prior to the expansion and recycled, after regeneration and compression, through pipe 37 to the regenerated main catalyst cycle before the latter enters reactor 32. After expansion to 1.8 atmospheres gage, the acetaldehyde and small portions of ethylene are removed from the catalyst by stripping in column 38. After being separated from the acetaldehyde, the ethylene, which may still contain a small portion of acetaldehyde, is also introduced into the regenerated main catalyst cycle.

From the regenerated main catalyst cycle, about 20 liters per hour are branched off through pipe 42 to form a derived catalyst cycle and united in stripping column 38 at a position below the stripping zone with reacted and stripped main catalyst cycle, that is with catalyst that is almost free from acetaldehyde. The derived cycle flowing through pipe 42 is expanded to the pressure prevailing in stripping column 38. The water vapor set free thereby is simultaneously used for stripping the catalyst. From the reacted main catalyst cycle about 5 liters per hour are branched off through pipe 43 after pump 40 but before oxygen inlet 41 and united with the main catalyst cycle flowing through pipe 36 before the main catalyst cycle enters reactor 32.

When carrying out the process as described above but without branching off part of the catalyst through pipes 42 and 43 and while cycling about 85 liters per hour of catalyst through both the reactor and the regenerator, the acetaldehyde is obtained in a total space-time yield of 375 grams per liter of total volume (reactor and regenerator volume) and per hour. A small increase of the space-time yield produced, for example, by increasing the reaction temperature to 195° C., gives rise to precipitations of cuprous chloride in the sump of the stripping column. When conducting part of the catalyst through pipe 42, but not through pipe 43, about 105 liters per hour are cycled through the regenerator and 85 liters per hour are cycled through the reactor, the space-time yield amounting to 475 grams acetaldehyde. When part of the catalyst is derived through pipe 42 and also pipe 43, about 100 liters per hour are cycled through the regenerator and about 90 liters per hour are cycled through the reactor, the space-time yield amounting to 500 grams acetaldehyde. No precipitation of cuprous chloride is observed.

When the process of the invention is used for oxidizing olefins, disturbances due to precipitations of the reduced stages of the redox compounds and/or noble metal compounds do not, therefore, occur. The process of the invention enables the saving of additional costs of regeneration apparatus necessary, for example, for isolating the precipitations of the reduced stages of the redox compounds and/or noble metal compounds and for working up these precipitations periodically or continuously in a separate operation by oxidation.

The pipes and other devices are advantageously made of titanium or titanium alloys containing, for example, at least 30% titanium, and of tantalum. If desired, glass vessels or enameled or rubber-lined vessels or pipes may also be used. The reaction or regeneration may furthermore be carried out in vessels lined with bricks or, with appropriate reaction or regeneration conditions, in vessels lined with plastics, for example polyolefins, polytetrafluoroethylene or hardenable unsaturated polyesters or phenol-, cresol- or xylenolformaldehyde resins. The lining may also consist of ceramic material, carbon bricks impregnated with hardenable synthetic resins and similar known materials.

The process of the invention is carried out in the presence of water and the above-mentioned catalysts which may contain noble metal salts, advantageously in the presence of redox systems which still contain copper salts. It is of particular advantage to use catalysts containing noble metal salts, preferably palladium salts.

It is especially advantageous to use catalysts which, besides palladium and copper compounds, also contain iron, chromium, manganese and/or cerium compounds. In many cases it is sufficient to use a ratio of copper:palladium of above 10:1, for example above 15:1, and advantageously up to 100:1 or even more, for example 50 to 500:1.

As anions there may be used, for example, halogen anions, such as bromine ions, advantageously chlorine ions or chlorate, perchlorate, nitrate or mixtures of such anions with sulfate or acetate groups.

In another advantageous form of the process of the present invention, catalysts containing chlorine ions are used and further anions, advantageously chlorine anions, are added during the reaction, for example in the form of hydrogen chloride or of compounds yielding chlorine ions, e.g. acetyl chloride, ethyl chloride, tertiary butyl chloride or bromotrichloride. In this case the ratio of copper:chlorine is advantageously adjusted to a range of 1:1 to 1:3, preferably 1:1.4 to 1:2.5, whereby the chlorine ions contained in neutral salts, such as sodium chloride, are not considered.

The pH is advantageously within the range of 0.8 to 5 but may be outside this range, if desired; it may be, for example, 0.5. The temperature advantageously amounts to 50 to 160° C. but it is not confined to this range. For example, when proceeding in a flow tube, temperatures up to 250° C., and advantageously from 150 to 220° C., may be used. The process may be carried out under atmospheric pressure, elevated or reduced pressure, for example under a pressure up to 100, advantageously up to 50, atmospheres gage. The catalyst may be regenerated under known conditions, for example at a temperature within the range of 50 to 150° C., and even at pressures and/or temperatures different from those used in the reaction stage. Pressure may be applied regardless of whether the process is carried out at a temperature above or below 100° C. At temperatures above 100° C. it is necessary to apply pressure or to add substances capable of increasing the boiling point. It may furthermore be of advantage to add a salt regardless of the temperature used. There may be used, for example, the chlorides or acetates of lithium, sodium, potassium, ammonium, calcium, barium, magnesium, zinc or $FeCl_3$, $FeCl_2$ or salts of the aforesaid elements with other anions. When liquid catalysts are used, there may be additionally used solvents containing hydrophilic groups, for example acetic acid, ethylene glycol, propylene glycol, glycerol, dioxan or mixtures thereof.

When proceeding in the absence of noble metals and in the presence of organic redox systems as described in the aforesaid patent application Serial No. 765,272, a temperature within the range of 50 to 250° C., suitably 100 to 250° C. and advantageously 130 to 200° C., and a pressure up to 400 atmospheres gage, suitably between 20 and 200 and advantageously 80 to 120 atmospheres gage are used. The reaction may also be carried out at temperatures and pressures outside the indicated ranges, for example at a temperature above room temperature or under atmospheric pressure or a pressure of 450 atmospheres gage. In this form of the invention a pH value within the range of 1 to 5 is advantageously used though higher or lower pH values, for example a pH value of 0, may also be used.

The process of the present invention may not only be used for converting ethylene to acetaldehyde and acetic acid but also for reacting higher olefins, for example propylene, butylenes and pentenes. For example, propylene yields preponderantly acetone and propionaldehyde, butylenes yield methylethylketone, butyraldehyde or isobutyraldehyde and butadiene yields diacetyl and crotonaldehyde.

As oxidizing agent, oxygen is advantageously used, if desired in the form of air or of air enriched with oxygen. The reactants may be used in the pure state or in the form of gas mixtures and may be introduced either in a premixed form or separately each through one or more inlets which may be disposed one after the other in the direction of flow. The olefins may be mixed, for example, with saturated aliphatic hydrocarbons, such as methane, ethane, propane, butane, isobutane or higher saturated aliphatic substances, cyclohexane, benzene, toluene or nitrogen, carbon dioxide, carbon monoxide and hydrogen, which are attacked by the aforesaid catalysts only partially if at all, or any mixture of these substances.

The reaction may be carried out under the influence of active radiation, especially ultraviolet light, whereby it is particularly advantageous to irradiate the oxygen or the catalyst near the oxygen inlet.

By appropriate adjustment of the temperature, pressure and the amount of olefin, a substantially complete conversion of the olefin can be obtained in one passage. To avoid certain disadvantages involved in the use of catalysts containing palladium salt, small portions of compounds of metals that are nobler than palladium may be added to the catalyst. Finally, it may be of advantage in special cases to contact the gaseous or vaporous components leaving the catalyst with metals or metal alloys having fairly large surfaces and a potential in the electromotive series that is above −1.7 and below that of the noblest component of the catalyst.

We claim:

1. A process for the conversion of an olefinic hydrocarbon to a carbonyl compound selected from the group consisting of aldehydes and ketones by oxidation of an olefinic carbon atom of said olefinic hydrocarbon to a carbonyl group, which process consists essentially of contacting said olefinic hydrocarbon and oxygen with a neutral to acid liquid aqueous catalyst of (a) a salt of a noble metal selected from the group consisting of palladium, iridium, ruthenium, rhodium, and platinum, and (b) as a redox system, a salt of a metal showing several valence states under the reaction conditions applied, said olefinic hydrocarbon and said liquid catalyst being contacted in a first contact zone, and at least a portion of said oxygen and said liquid catalyst being contacted in a separate second contact zone whereby said catalyst is regenerated, circulating said liquid catalyst between said first and second zone such that from 5 to 25 percent by volume of the liquid catalyst leaving at least one of said contact zones is directly recycled to the same contact zone and the balance of the liquid catalyst is circulated to the other contact zone, the total amount of liquid catalyst conducted at a given time into said first contact zone by recycling from said first zone and circulation from said second zone being unequal to the total amount of liquid catalyst conducted at the same time into said second contact zone by recycling from said second zone and circulation from said first zone.

2. A process as in claim 1 wherein dissolved reaction products and unreacted reactants are removed from said liquid catalyst circulating between said first contact zone and said second contact zone, and wherein a portion of regenerated liquid catalyst leaving said second contact zone is recycled to said second zone, whereby it is admixed with liquid catalyst entering said second contact zone by circulation from said first contact zone.

3. A process as in claim 1 wherein said noble metal is palladium and said metal showing several valence states is copper.

4. A process as in claim 1 wherein chloride ions are added to said liquid catalyst after leaving said second contact zone but before leaving said first contact zone.

References Cited in the file of this patent

UNITED STATES PATENTS 3,122,586    Berndt et al.    Feb. 25, 1964

FOREIGN PATENTS 891,209    France    Mar. 1, 1944
713,791    Germany    Nov. 14, 1941

OTHER REFERENCES

Phillips: Amer. Chem. Journal, vol. 16 (1894), p. 267.
Chatt: Chemical Abstracts, vol. 48 (1954), pp. 5067–5068.